United States Patent [19]
Smith et al.

[11] Patent Number: 5,101,193
[45] Date of Patent: Mar. 31, 1992

[54] UNIVERSAL STAND-ALONE HOLOGRAPHIC CENTER HIGH MOUNTED STOPLIGHT

[75] Inventors: Ronald T. Smith, Torrance; Andrew J. Daiber, Rancho Palos Verdes; John E. Gunther, Torrance; James E. Scott, Culver City; Michael J. Virgadamo, Pasadena; Kevin Yu, Temple City, all of Calif.

[73] Assignee: Hughes Aircraft Company, Los Angeles, Calif.

[21] Appl. No.: 510,320

[22] Filed: Apr. 16, 1990

[51] Int. Cl.$^5$ .......................... B60Q 1/44; G02B 5/32
[52] U.S. Cl. ................................. 340/479; 340/468; 362/80.1; 359/1; 359/15; 359/19
[58] Field of Search .............. 340/479, 468; 362/80.1, 362/84; 307/10.8; 350/3.7, 3.6, 3.72

[56] References Cited

U.S. PATENT DOCUMENTS

| | | | |
|---|---|---|---|
| 4,892,369 | 1/1990 | Moss | 340/479 |
| 4,916,593 | 4/1990 | Moss et al. | 340/479 |
| 4,935,722 | 6/1990 | Pollack | 340/479 |

*Primary Examiner*—Donnie L. Crosland
*Attorney, Agent, or Firm*—Leonard A. Alkov; Wanda K. Denson-Low

[57] ABSTRACT

A holographic stoplight for a vehicle including a stoplight hologram, a source of playback illumination, and a transparent prism for supporting the stoplight hologram and for guiding the playback illumination to the stoplight hologram. The prism with the stoplight hologram is mounted in front of the rear window of a vehicle with the light source beneath the surface of the rear panel that is adjacent the rear window.

14 Claims, 3 Drawing Sheets

UNIVERSAL STAND-ALONE HOLOGRAPHIC CENTER HIGH MOUNTED STOPLIGHT

BACKGROUND OF THE INVENTION

The disclosed invention generally relates to center high mounted brake lights or stoplights for vehicles, and more particularly is directed to a stand-alone holographic center high mounted stoplight assembly that does not utilize the vehicle rear window to support the hologram structure of the stoplight assembly.

Present federal regulations require center high mounted stoplights in automobiles in addition to the traditional stoplights. The high mounted stoplights are intended to maximize the visibility of the stoplights to following drivers.

Center high mounted stoplights have been implemented as a standard red transmitting lenticular lens and an illuminating incandescent bulb enclosed in a housing that is commonly secured adjacent the top or bottom of an automobile rear window (also referred to as an automobile backlight). The bulky housing, which is intended to prevent scattered stoplight illumination from being within the driver's rearward field of view, partially obscures rearward visibility, imposes limitations on design, and is generally unattractive.

In order to avoid the visibility obscuration of the bulb and lens center high mounted stoplight, holographic stoplight systems have been developed wherein holograms secured to the automobile backlight provide stoplight illumination when illuminated with playback illumination. The holograms are substantially transparent to the driver's rearward field of view, and the playback illumination source is outside such field of view, which avoids the obscuration presented by the bulb and lens type stoplight assemblies. Examples of center high mounted holographic stoplight systems are disclosed in commonly assigned U.S. Ser. No. 07/000,793, filed Jan. 7, 1987 now U.S. Pat. No. 4,892,369 and U.S. Ser. No. 07/293,927, filed Jan. 4, 1989 now U.S. Pat. No. 4,916,593.

A consideration with known holographic stoplight systems in general is the utilization of the vehicle rear window to support the holographic structure of the system, which requires additional lamination processing and which requires adaption of the system for each different rear window configuration.

Further considerations with known holographic stoplight systems that utilize projected playback illumination include possible blockage by items placed in the rear of the vehicle, the possibility of objectionable reflections off the rear window, and objectionable heat from the light source. A further consideration with a holographic stoplight system that utilizes projected playback illumination is ambient turn-on, including turn-on that diffracts light into the vehicle operator's rearward field of view.

A further known holographic stoplight system couples playback illumination through the edge of the hologram, for example, by a fiber optic link, as disclosed in commonly assigned U.S. Pat. No. 4,892,369, issued Jan. 9, 1990. A consideration with an edge coupled system is the efficiency of the hologram and the use of a highly collimated, very narrow bandwidth playback illumination such as could be provided by a laser or very bright playback illumination.

Other considerations with known holographic stoplight systems include the complexity and difficult assembly of the optical elements.

SUMMARY OF THE INVENTION

It would therefore be an advantage to provide a holographic stoplight system that does not utilize the vehicle rear window to support the holographic structure of the stoplight.

Another advantage would be to provide a holographic stoplight system that does not utilize projected playback illumination and does not utilize the vehicle rear window to support the holographic structure of the stoplight.

Still another advantage would be to provide a holographic stoplight system that utilizes a relatively low power source of light and does not utilize the vehicle rear window to support the holographic structure of the stoplight.

A further advantage would be to provide a holographic stoplight system that does not utilize complex optical elements and does not utilize the vehicle rear window to support the holographic structure of the stoplight.

The foregoing and other advantages are provided by the invention in a holographic stoplight for a vehicle that includes a stoplight hologram, a source of playback illumination, and a transparent prism for supporting the stoplight hologram and for guiding the playback illumination to the stoplight hologram.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
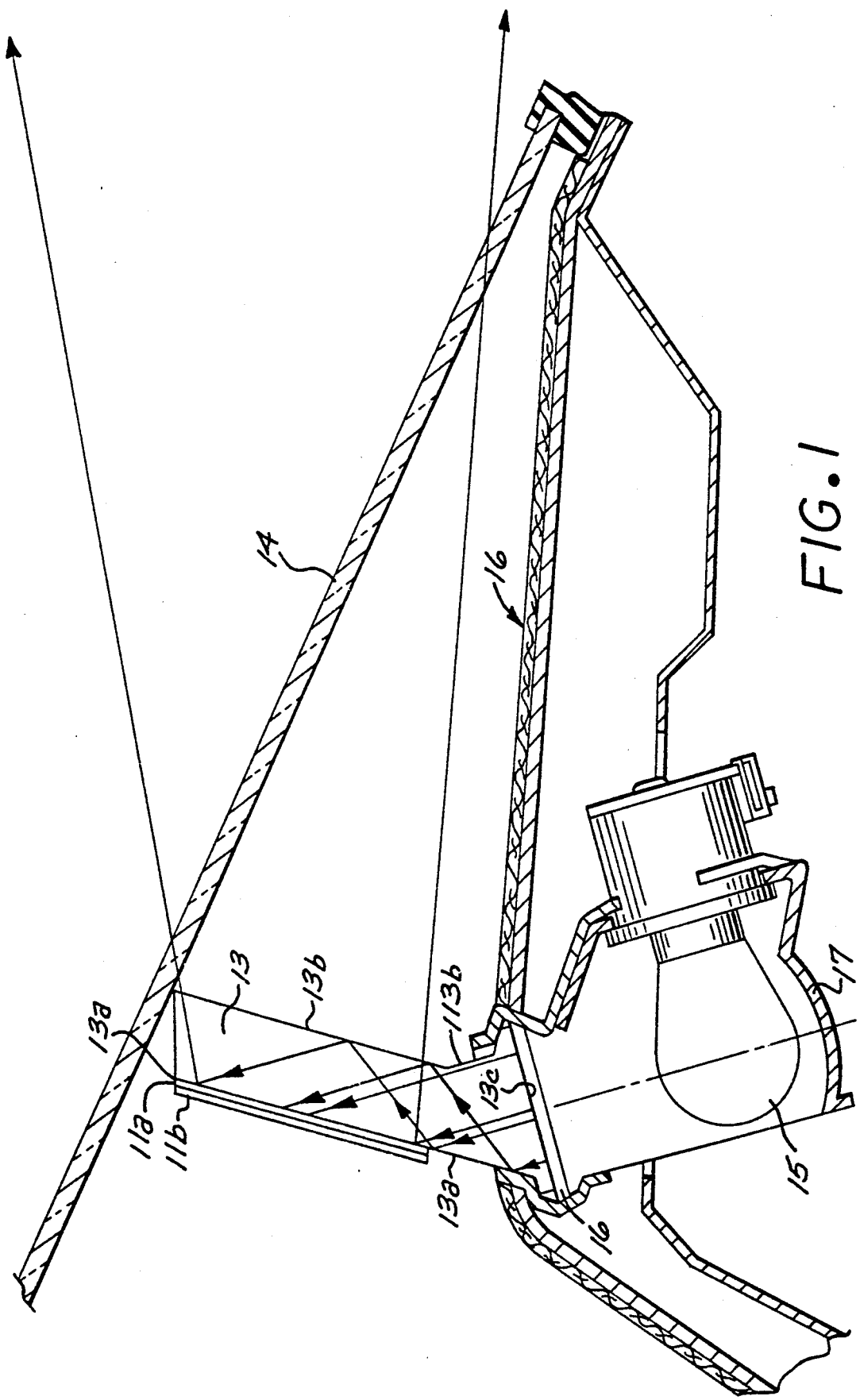
FIG. 1 is schematic side elevational view depicting a stand alone holographic stoplight system in accordance with the invention.

In the following detailed description and in the several figures of the drawing, like elements are identified with like reference numerals.

Referring now to FIG. shown therein is a holographic stoplight system that includes a hologram structure 11 that is laminated to the top portion of the front face 13a of a prism 13 located in front of the vehicle rear window 14. By way of illustrative example, the hologram structure includes a volume reflection hologram 11a and a transparent plastic backing sheet 11b, and is laminated with index matching adhesive to front face 13a of the prism 13 with the volume hologram 11a adjacent the front face of the prism 13.

The volume hologram 11a produces stoplight illumination in response to playback illumination that is coupled thereto by the prism 13. As discussed more fully herein, such playback illumination reaches the hologram directly without any internal reflections and via substantially total internal reflection. The volume hologram 11b can be recorded with a horizontal cylindrical lens array (i.e., a cylindrical lens array having the parallel longitudinal axes of the lenses oriented horizontally) to provide for spreading of the stoplight illumination in the vertical direction as viewed from behind the vehicle, with stoplight illumination spreading in the horizontal direction as viewed from behind the vehicle being provided by controlling the playback illumination as described further below.

The prism 13 includes an upper rear face 13b that is parallel to front face to form a parallel faced top section that minimizes translation of the see-through scene relative to the scene around the prism. The front face 13a and the upper rear face 13b of the prism are slightly tilted back from vertical in order to avoid light diffracted by the hologram and reflected off the rear prism/air interface from travelling forward to the rearview mirror of the vehicle. However, the prism must not be tilted too much, or else light passing through the top of the vehicle rear window toward the plastic substrate covering the hologram will reflect off the plastic substrate and the rear prism face into the rearview mirror.

The top face of the prism is substantially horizontal, and the transverse sides of the prism are in parallel vertical planes. This allows the top and sides of the prism to be nearly invisible to the vehicle operator when viewed via the rearview mirror. The top surface of the prism is coated with a suitable black absorptive paint which prevents ambient turn-on due to sunlight entering the prism 13 through its top surface and projecting onto the hologram, and further prevents internal reflections that could cause diffraction or scattering toward the vehicle operator.

The thickness T of the prism between the front and rear faces 13a, 13b of the parallel faced section is selected by balancing the requirements of see-through performance and hologram performance. A very thin prism would increase see-through performance, and would be generally more aesthetically pleasing. However, a thinner prism would necessarily result in a larger playback incidence angle relative to normal than in a thicker prism. As is well known, attempting to record and playback a hologram with a beam that is greater than 70 degrees relative to normal creates problems arising from slight interfacial index mismatches, and also results in a hologram having reduced angular and spectral bandwidths. By way of illustrative example, an internal illumination angle of about 58 degrees relative to normal with an acrylic prism yields a relatively thin prism and a reasonably high performance hologram.

The prism 13 further includes a light coupling face 13c which forms an acute angle with the front face 13a as measured within the prism. A lower rear face 113b a rear face that is normal to the coupling face 13c and extends upwardly from the coupling face 13c to the upper rear face 13b and forms and angle of less than 180 degrees with the upper rear face as measured outside the prism.

The playback illumination beam is incident on the coupling face 13c and normal thereto, and thus generally parallel to the lower rear face 113b of the prism. For a given desired incidence angle within the prism at the front face thereof, the acute angle between the front face 13a and the coupling face 13c of the prism is equal to such incidence angle as measured relative to normal.

Playback illumination is provided by an incandescent bulb 15, a parabolic reflector 17, and an acylindrical lens array filter 16 that is adjacent the coupling face 13c. The incandescent bulb 15, which can be a non-halogen bulb, is connected to the brake light actuating circuit of the vehicle so as to be energized when the brake pedal is depressed. The combination of the bulb and reflector provides nearly collimated illumination into the filter 16 whose output is coupled into the light coupling section of the prism at the coupling face thereof.

The acylindrical lens array filter 16 comprises an array of parallel acylindrical lenses oriented to provide for horizontal spreading of the stoplight illumination produced by the hologram, and can be a high pass filter or a narrow band filter, depending upon stoplight image sharpness requirements, which in combination with the incandescent bulb 15 provide the appropriate luminous intensity spectral bandwidth to comply with the federal stoplight specifications.

By way of particular example, for a hologram where the hologram image is focused in the hologram plane, a high pass filter having a cutoff wavelength of about 600 nanometers (nm) would produce an image that will be perceived as red, with the apparent peak luminous intensity being somewhere between about 600 nm and 620 nm. For holograms wherein the hologram image is focused away from the hologram plane and certain image sharpness requirements exist, the luminous spectral bandwidth may need to be reduced below that which occurs with a high pass filter, and a narrow bandpass filter would be utilized.

The division of the beam spreading functions in orthogonal directions between the hologram and the acylindrical lens array filter 16 takes advantage of the fact that hologram diffraction efficiency is much less sensitive to changes in incident angle normal to the nominal plane of incidence compared to within the plane of incidence. Although the light reaching the hologram is no longer quasi-collimated, the angular spread of light incident on the hologram is within a plane normal to the plane of incidence; therefore, the hologram diffracts the light efficiently. The effect of horizontally spreading the light incident on the hologram is to horizontally spread the diffracted light as well. Between the horizontal spreading provided by the vertical lens array filter and the vertical spreading provided by the hologram, the federally required angular coverage of light is met. Looking at the hologram playback from behind, one sees a two-dimensional rectangular grid of light spots, as in a conventional stoplight.

By taking advantage of the foregoing diffraction efficiency characteristics, the division of the lenticulation function provides a relatively straightforward approach to meeting the federal stoplight angular coverage requirements. The federal requirement calls for a reasonably uniform vertical coverage over only $+10°$ to $-5°$, but the horizontal coverage is non-uniform and must extend out to $\pm 45°$. Uniform vertical coverage can be recorded in the hologram with a glass cylinder lens array; however, non-uniform horizontal coverage may require use of an acylindrical lens array in the hologram recording. Acylindrical lens arrays are very expensive to make in glass, and plastic acylindrical lens arrays suffer from surface scatter that is recorded in the hologram. Furthermore, the need to refine the horizontal spread pattern on playback probably requires an iterative approach where the acylindrical lens arrays are modified several times. This is inconvenient if the horizontal spread function needs to be recorded in the hologram. Using the acylindrical lens array in the playback system and recording only the glass horizontal lens array in the hologram alleviates these problems and results in a lower scatter hologram.

It should be appreciated that the entire lenticulation function in the two directions can be provided by the hologram, in which case the filter 16 would be a plain filter. As still a further alternative, the two orthogonal directions of lenticulation can be provided by the filter 16.

In operation, as schematically depicted in FIG. 1, playback illumination for the lower part of the hologram is provided directly without any internal reflections, while playback illumination for the upper part of the hologram is provided pursuant to two internal reflections within the prism.

It should be appreciated that although a reflection hologram is utilized in the system of FIG. a transmission hologram could also be utilized, in which case the hologram would be configured to diffract illumination that is internally reflected at the forwardly located air interface of the outer transparent substrate after initially passing through the hologram at angle that is not appropriate for diffraction.

Figure 2:
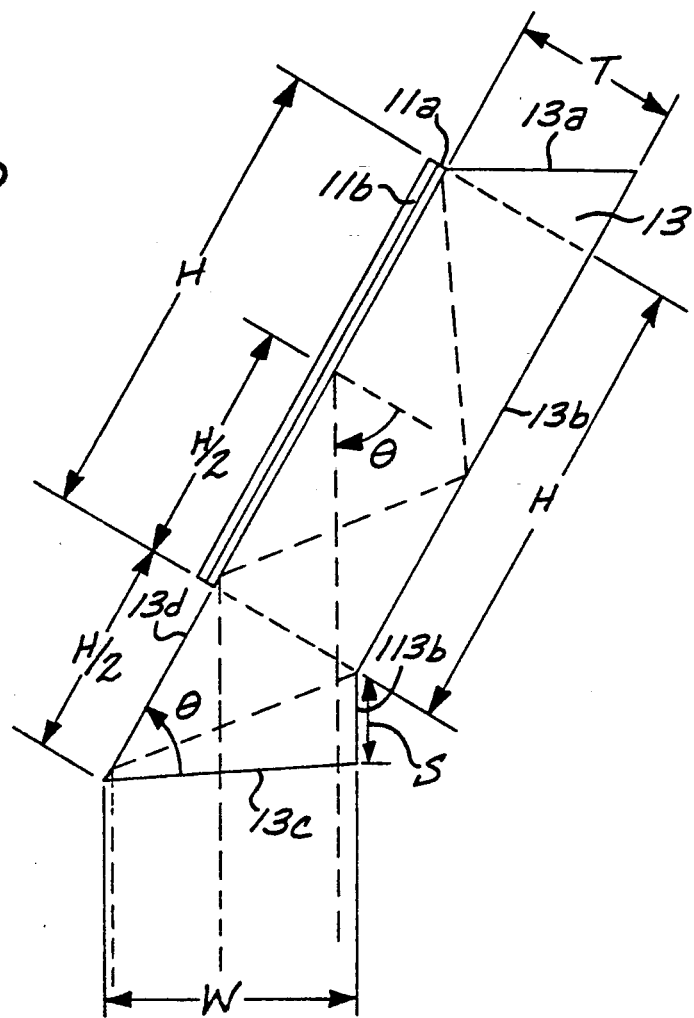
FIG. 2 is a detail view illustrating the dimensions of the transparent prism of the stand alone holographic stoplight system of FIG. 1.

Turning now to FIG. 2, the dimensions of the prism faces are related to the hologram height H, the thickness T of the prism between the parallel front and rear faces, and the incidence angle $\theta$ as follows. The height of the entire front prism face 13a is 3H/2, with the height of the lower portion of the front face being H/2. The height of the upper rear face 13b is greater than H to provide for a substantially horizontal top prism face, and the width W of the coupling face 13a is (H)cos$\theta$. Pursuant to straight-forward geometry, the following expression for the height S of the lower rear face 113b can be derived:

$$S^2 = (H^2)/4 + T^2 - W^2$$

By way of illustrative example, the foregoing stand-alone holographic stoplight system is installed near the rear window 14 of a vehicle, with the parallel faced prism section and only part of the lower prism section having non-parallel front and rear faces being above the surface of the rear panel 16 that is below the rear window 14. In other words, the bulb, reflector, and filter are below the rear panel surface, and only substantially transparent components are above the rear panel surface.

Figure 3:
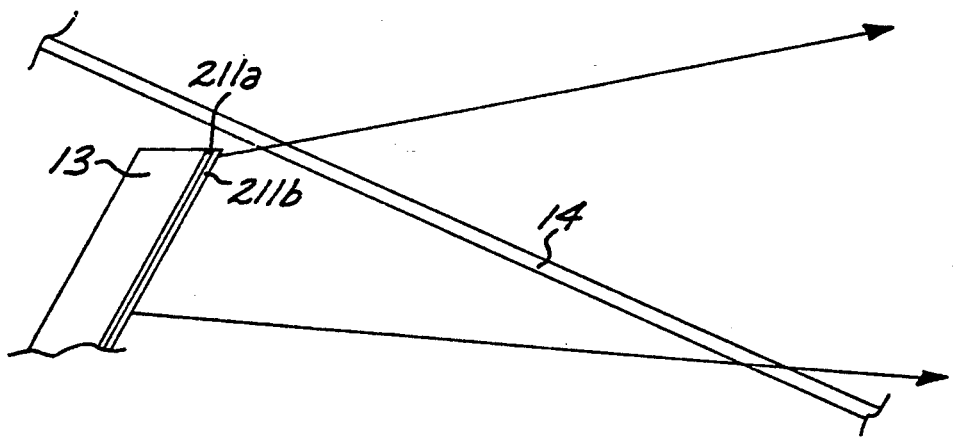
FIG. 3 is a schematic side elevational view depicting a further stand alone holographic stoplight system in accordance with the invention.

Referring now to FIG. 3, shown therein is a further stand-alone holographic stoplight system in accordance with the invention. The system of FIG. 3 differs from that of FIG. 1 by having a stoplight reflection volume hologram 211a on the rear face of the prism. A reflection hologram is utilized to have a more favorable playback incidence angle, and is configured to diffract illumination that is substantially totally internally reflected at the rearwardly located air interface of the outer transparent substrate 211b of the hologram structure 211 after initially passing through the hologram 211a at an angle not appropriate for diffraction. The illumination initially passes through the reflection hologram at an angle not appropriate for diffraction as a result of substantially total internal reflection at the prism front face air interface.

In the system of FIG. 3, the parallel faced section of the prism is also tilted back from vertical for the same reflection considerations as the system in FIG. 1, except that the diffracted light reflections of concern would occur at the air interface of the plastic substrate 211b covering the hologram 211a.

Figure 4:
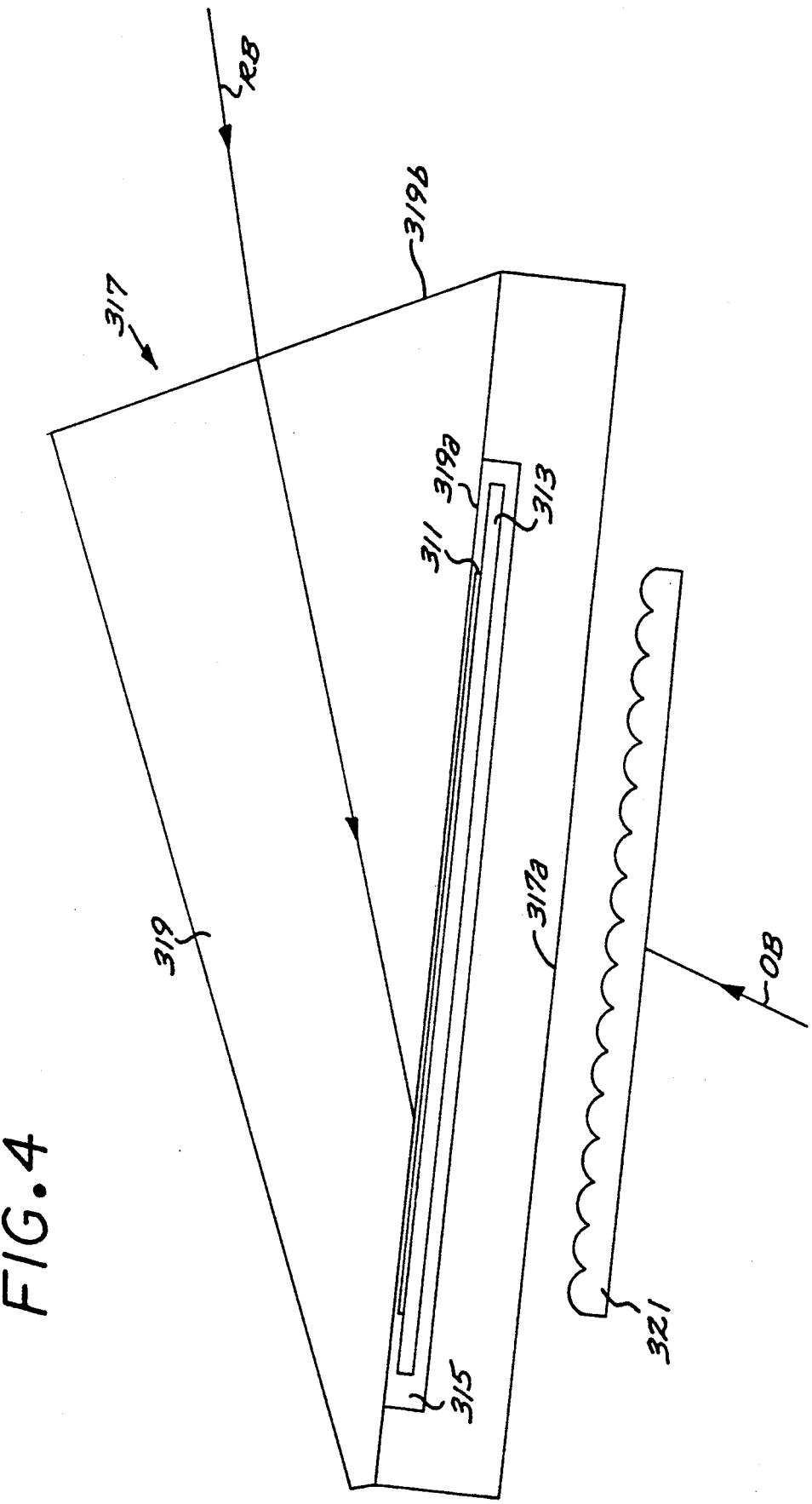
FIG. 4 illustrates an exposure setup for recording a hologram for the disclosed stand alone holographic stoplight system.

Referring now to FIG. 4, shown therein is a top view an illustrative example of an exposure setup that can be utilized to record the stoplight hologram structure 111 in accordance with the invention.

A hologram recording plate including a holographic recording layer 311 and a supporting substrate 313 is supported in the opening 315 of an oil gate trough 317. By way of illustrative examples, the holographic recording layer comprises dichromated gelatin or a photopolymer compound. One side of the opening comprises a face 319a of a wedge prism 319, and the recording medium is supported parallel to such prism face. The wedge prism 319 further includes a face 319b that forms an acute angle relative to the face 319a.

The oil gate trough 317 also includes an outside surface that is parallel to the wedge prism face 319a that forms one side of the oil gate trough opening 315. The opening 315 of the oil gate trough is filled with refractive index matching fluid.

The exposure set up further includes an acylindrical lens array 321 that is parallel to the outside surface 617a of the oil gate trough, and is spaced therefrom by an air gap. By way of illustrative example, the acylindrical lens array 321 comprises a positive plano-convex acylindrical lens array for dispersing light in the horizontal direction.

Respective collimated beams are utilized for a reference beam RB and an object beam OB. Preferably, such beams originate from the same laser source whose output is split by a beamsplitter. The beamsplitter outputs are made to diverge by respective diverging optics, such as an objective lens and pinhole diaphragm. The respective diverging beams are then collimated by respective collimating optical elements.

The collimated beam for the reference beam RB is coupled to the recording medium via the prism face 319a at an angle that is appropriate for the intended playback geometry, which will typically be large as measured relative to normal.

The collimated beam for the object beam OB is directed to the lenticular lens array 321 at an angle based on the required directionality of the diffracted playback illumination, with appropriate regard for the angular orientation of the prism face on which the hologram will be mounted.

The foregoing has been a disclosure of a holographic stoplight system that does not utilize a vehicle rear window for supporting the hologram and is readily adapted to different vehicles having different rear window configurations. The disclosed holographic stoplight system is efficient and operates with a low power source of playback illumination that is advantageously located close to the hologram but out of the view and reach of the vehicle occupants. Further, the disclosed holographic stoplight system does not utilize complex optical elements and is not subject to inadvertent turn-off as a result of blockage of playback illumination from the hologram.

Although the foregoing has been a description and illustration of specific embodiments of the invention, various modifications and changes thereto can be made by persons skilled in the art without departing from the scope and spirit of the invention as defined by the following claims.

What is claimed is:

1. A holographic stoplight for a vehicle comprising:
   illumination means for providing playback illumination;
   a hologram responsive to playback illumination for producing stoplight illumination in response to such playback illumination; and
   a transparent substrate discrete from a vehicle rear window for supporting said hologram and configured to guide playback illumination from said illumination means to said hologram, with a portion of said playback illumination being guided by internal reflection.

2. The holographic stoplight of claim 1 wherein said illumination means includes lenticulation means for providing spreading of the stoplight illumination in a first direction, and wherein said hologram is recorded to provide spreading of the stoplight illumination in a second direction orthogonal to said first direction.

3. The holographic stoplight of claim 1 wherein said illumination means includes lenticulation means for providing spreading of the stoplight illumination in first and second directions orthogonal to each other.

4. The holographic stoplight of claim 1 wherein said hologram is recorded to provide spreading of the stoplight illumination in first and second directions orthogonal to each other.

5. The holographic stoplight of claim 1 wherein said transparent substrate comprises a prism having front and rear faces, and wherein said hologram is laminated to one of said front and rear faces.

6. The holographic stoplight of claim 5 wherein said prism further includes a light coupling section for receiving the playback illumination from said illumination source.

7. The holographic stoplight of claim 6 wherein said illumination means includes an incandescent bulb.

8. A holographic stoplight for a vehicle comprising:
   illumination means for providing playback illumination;
   a hologram responsive to playback illumination for producing stoplight illumination in response to such playback illumination; and
   a transparent prism having front and rear parallel faces for supporting said hologram on one of said front and rear faces, and being configured to guide playback illumination from said illumination means to said hologram, with a portion of said playback illumination being guided by internal reflection.

9. The holographic stoplight of claim 8 wherein said illumination means includes lenticulation means for providing spreading of the stoplight illumination in a first direction, and wherein said hologram is recorded to provide spreading of the stoplight illumination in a second direction orthogonal to said first direction.

10. The holographic stoplight of claim 8 wherein said illumination means includes lenticulation means for providing spreading of the stoplight illumination in first and second directions orthogonal to each other.

11. The holographic stoplight of claim 8 wherein said hologram is recorded to provide spreading of the stoplight illumination in first and second directions orthogonal to each other.

12. A holographic stoplight for a vehicle comprising:
    a light source for providing illumination; filtering means for filtering and spreading said illumination to provide filtered and spread playback illumination;
    a transparent prism having front and rear parallel faces being configured to guide said filtered and spread playback illumination to said front face, wherein a portion of the playback illumination is guided by internal reflection; and
    a hologram secured to said prism front face for diffracting and spreading said guided playback illumination to produce holographic stoplight image in response to said guided playback illumination, wherein the spreading provided by said filtering means results in spreading of the stoplight illumination in a first direction and wherein the spreading provided by said hologram is in a second direction orthogonal to said first direction.

13. The holographic stoplight of claim 12 wherein said first direction is horizontal and said second direction is vertical, as viewed from the rear of the vehicle.

14. The holographic stoplight of claim 13 wherein said hologram comprises a reflection hologram.

* * * * *